Dec. 17, 1940.　　　　A. H. STEIN　　　　2,225,572
COOKSTOVE
Filed May 29, 1939　　　　2 Sheets-Sheet 1
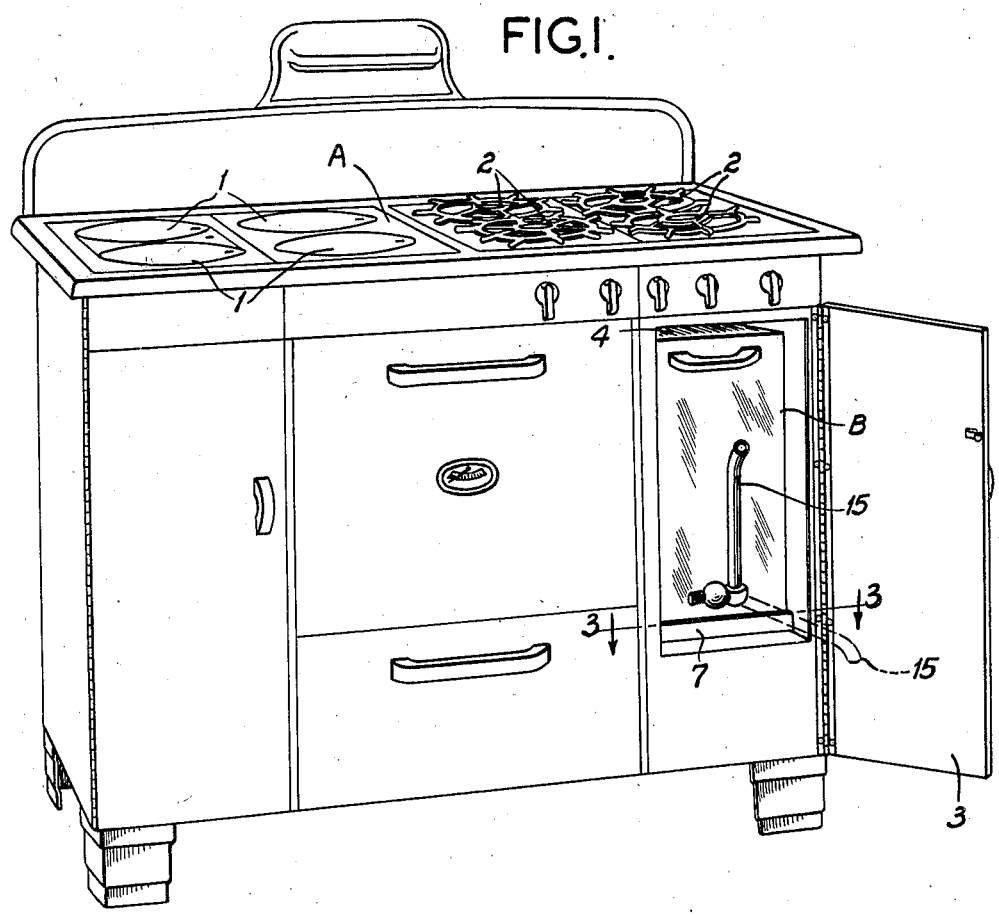
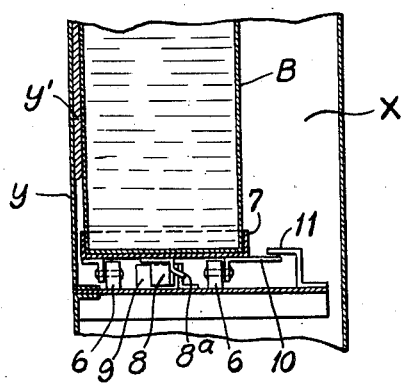
INVENTOR:
ARTHUR H. STEIN
ATTORNEY.

Dec. 17, 1940.  A. H. STEIN  2,225,572

COOKSTOVE

Filed May 29, 1939  2 Sheets-Sheet 2

INVENTOR;
ARTHUR H. STEIN
BY Wells R. Church
ATTORNEY.

Patented Dec. 17, 1940

2,225,572

UNITED STATES PATENT OFFICE 2,225,572

COOKSTOVE

Arthur H. Stein, Webster Groves, Mo., assignor to Copper Clad Malleable Range Company, St. Louis, Mo., a corporation of Nebraska Application May 29, 1939, Serial No. 276,275

7 Claims. (Cl. 126—34)

This invention relates to cookstoves of the type that are equipped with a hot water reservoir, i. e., cookstoves of the kind that comprise a large receptacle for holding water which is heated, usually by heat that radiates from an internal part of the stove with which said reservoir contacts.

The main object of my invention is to provide a cookstove of the general type mentioned, in which the hot water reservoir takes up no part of the top of the stove, and is capable of being filled, without disturbing or changing the position of cooking utensils positioned on the stove top.

Another object of my invention is to provide a cookstove of the general type mentioned, in which the hot water reservoir is easily accessible for filling, and is so disposed or mounted, that it does not constitute a projection or extension on the back or on either end of the stove.

Another object of my invention is to provide a cookstove, that is equipped with a bodily shiftable hot water reservoir, and with means for positively moving said reservoir into intimate engagement with an internal part of the stove that is used to heat the reservoir, during the operation of shifting said reservoir from its "filling" position into its "heating" position.

And still another object of my invention is to provide a cookstove, which, in addition to having the desirable features or characteristics previously pointed out, is compact, symmetrical and of attractive appearance.

To this end I have devised a cookstove equipped with a bodily shiftable hot water reservoir, that is normally housed within the four walls or vertical marginal portions of the stove, and which has to be partially withdrawn from the interior of the stove, in order to refill or replenish it with water. Preferably, said reservoir is shiftably mounted in an opening in the front wall or front portion of the stove, and it is located below the top of the stove at one side of a baking oven, which is accessible from the front of the stove. Said reservoir may be of any preferred shape and construction, and it is immaterial how it is combined with the other parts of the stove, so long as it is arranged so as to not take up or constitute a portion of the stove top, and is mounted so as to be capable of being quickly and easily shifted into what I will refer to as its "filling" position when replenishing of the water becomes necessary. In the preferred form of my invention herein illustrated the water reservoir is slidingly mounted, but it could be hinged, pivoted, or rockably mounted, without departing from the spirit of my invention. I have herein illustrated my invention applied to or embodied in a combination stove, whose top has two separate and distinct cooking zones, one of which comprises holes and stove lids for receiving cooking utensils that are to be heated with solid fuel, such as coal or wood, and the other zone comprising electric heating units or burners that are operated by gaseous or liquid fuel. However, I wish it to be understood that this is only one of many embodiments of my invention, and that my invention is not limited to a combination cookstove.

Figure 1 of the drawings is a perspective view of a combined cookstove constructed in accordance with my invention.

Figure 4 is a vertical transverse sectional view through the water reservoir, taken on approximately the line 4—4 of Figure 3.

Figure 2:
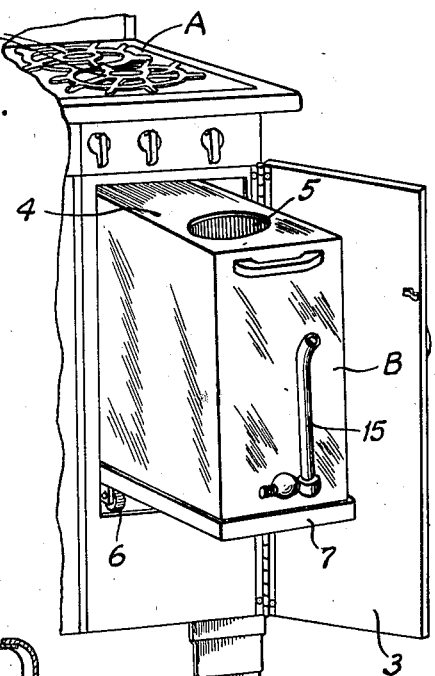
Figure 2 is a fragmentary perspective view of said stove, showing the water reservoir shifted into its filling position.

In the drawings A designates as an entirety the top of my improved stove. Said stove top comprises two zones or portions, one of which portions is adapted to receive cooking utensils that are to be heated with one kind of fuel, and the other portion being adapted to receive cooking utensils that are to be heated with a different kind of fuel. For example, the stove top A may comprise one or more openings for receiving cooking utensils that are to be heated with coal or wood, said openings being equipped with conventional removable closures or "stove lids" 1, and said top may comprise one or more gas burners 2 or electric heating units. Said two separate zones or utensil supporting portions make up the entire top A of the stove, and hence, my improved stove is distinguished from combination cook stoves of the type that comprise a hot water reservoir, in that the top of the stove is not provided with an opening through which water is introduced into the hot water reservoir.

The stove is equipped with a hot water reservoir B, that is normally housed within the four vertical walls of the stove at a point below the top A, and which is so constructed and arranged that it must be partially withdrawn from the interior of the stove, in order to refill it or replenish it with water. Preferably, the reservoir B is slidingly mounted in an opening in the front wall of the stove, and is located under the zone of the stove top A that comprises the gas burners 2. When said reservoir is in its normal heating position, shown in Figure 1, it is concealed or hidden from view by a door 3 that forms a portion of the front of the stove. To fill the reservoir B it is necessary to open the door 3, as shown in Figure 1, and then bodily shift said reservoir into its filling position, shown in Figure 2, by partially withdrawing it from the interior of the stove, or, in other words, sliding it forwardly so that the front end portion of said reservoir will project sufficiently beyond the front edge of the stove top A to permit water to be poured into said reservoir from a bucket or other receptacle. The reservoir B is herein illustrated as being substantially oblong-shaped in general form or outline, and provided with a top wall 4 that has a filling opening 5 adjacent its front end, which is normally closed by a removable lid or cover, but it will be obvious that the shape and details of construction of the reservoir B may be varied, without departing from the spirit of my invention. A closed top reservoir is desirable, however, in that water will not splash out of same when said reservoir is shifted from one position to another, and also because the top wall 4 imparts stiffness to the reservoir and makes it practicable to construct the reservoir from light gage metal. Usually, the reservoir B will have a hinged or swinging discharge spout 15 mounted on the front wall of same, so as to permit water to be easily withdrawn from the reservoir, simply by swinging the discharge spout 15 downwardly, as shown in dotted lines in Figure 1.

In order that the water reservoir will operate efficiently, it should be mounted in the stove in such a manner that one or more portions of said reservoir will normally be in contact or in close engagement with an internal part or portion of the stove that is capable of transmitting heat to the water of the reservoir. In the stove herein illustrated the water reservoir A is positioned in a chamber or space $x$ located at one side of the baking oven $y$ of the stove, and one of the side walls of said reservoir is intended to be normally held in snug engagement with one of the side walls $y'$ of the baking oven, so that heat from the oven will pass through said contacting walls to the water in the reservoir. In order that proper engagement between the water reservoir and its co-acting heating means will be insured, I prefer to construct said reservoir so that when it is moved from its filling position shown in Figure 2, into its heating position shown in Figure 1, said reservoir will be shifted automatically into engagement with the internal heating part of the stove, for example, the means $y'$ that is relied upon to heat the water in the reservoir. Figuratively speaking, there are a hundred and one different ways of constructing the stove to attain the result just mentioned, and while I prefer to equip the stove with a means that causes said reservoir B to shift laterally or sideways automatically while said reservoir is moving inwardly into its heating position, it is highly practicable to construct the stove in such a way that after the reservoir B has been moved inwardly into the space or chamber $x$ in which it is normally housed, a means or device can be actuated so as to bodily move the reservoir laterally into contact or intimate engagement with its co-acting heating means.

Figure 3:
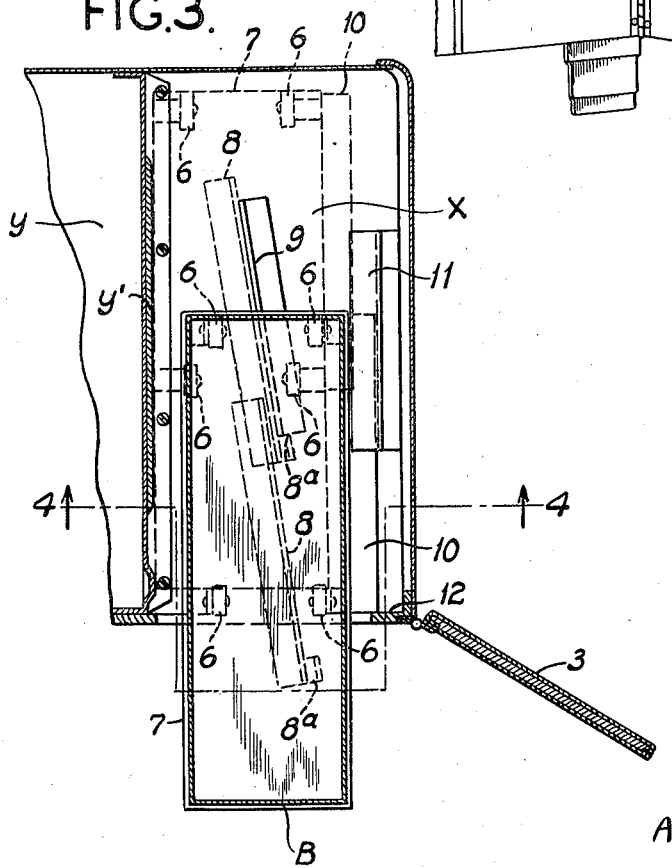
Figure 3 is a horizontal sectional view, taken on the line 3—3 of Figure 1.

I have herein illustrated one method of mounting the water reservoir B that I have found to be very satisfactory, on account of the ease and rapidity with which the reservoir can be replenished with water, and also because such a method of mounting the reservoir is inexpensive to construct, and is of sufficiently simple design to insure its standing up under the rough and continuous usage to which cookstoves are often subjected. Briefly stated, my preferred method of mounting the water reservoir B contemplates using wheels, rollers or other friction-reducing bearings to insure free and easy movement of the reservoir when it is shifted from one position to the other, and also contemplates the use of a cam, inclined groove or equivalent element disposed in such relationship with the general path or travel of the reservoir B when it is moved into and out of its filling position to effect the automatic engagement and disengagement between the reservoir and its co-acting heating means on the interior of the stove when the reservoir is slid into and out of the space in which it is normally housed. Thus, as shown in the drawings, the reservoir B is provided with supporting wheels or rollers 6 that can be attached directly to the lower end of the reservoir, or to a separate truck or carriage 7 in which the reservoir B is removably mounted, the wheels 6 being adapted to travel on the floor or bottom wall of the internal space or chamber $x$ of the stove that receives the reservoir. An inclined rib or depending member 8 is attached to the underside of the carriage 7, and a co-operating inclined rib or rail 9 is attached to the floor or bottom wall of the chamber $x$, said co-acting ribs or rails 8 and 9 being so disposed that when the reservoir B is moved inwardly from its filling position, shown in Figure 3, it will be shifted laterally into snug engagement with the internal heating part $y'$ of the stove, due to the pressure of the stationary rib 9 on the moving rib 8 attached to the carriage 7. Means are preferably provided to limit the forward movement of the supporting carriage 7 and to prevent the front end of said carriage and the reservoir B thereon from tilting downwardly in the operation of filling said reservoir, and while the particular construction of said means is immaterial, I prefer to provide the carriage 7 with a laterally-projecting flange 10 that is overlapped by a flange or guide bar 11 attached to the floor or bottom wall of the chamber $x$, the flange 10 on the carriage terminating short of the front end of the carriage, as shown in Figure 3, and being of such length that when the reservoir B is shifted forwardly into a certain approximate position, the front end of the flange 10 will act as a stop that strikes against a stationary member 12 (see Figure 3) that forms part of the front wall of the stove. When the reservoir B is in its filling position, or is partly withdrawn from the stove, as shown in Figures 2 and 3, the laterally-projecting flange 10 on the carriage 7 which sustains the reservoir is overlapped by the stationary guide bar 11. Hence, the front end of the carriage 7 and the reservoir supported by same is effectively prevented from tilting downwardly, as might occur if the parts 10 and 11 were omitted, or if some means were not employed to counteract or resist downward pressure exerted on the front end of the reservoir when it is in its filling position. When the carriage 7 is moved inwardly to arrange the reservoir B in its heating position, a stop 8ª, formed by a laterally bent portion of the flange 8 on the underside of the carriage 7, strikes against the front end of the stationary inclined guide rail 9, as indicated in broken lines in Figure 3, and thus serves as a means to limit the inward movement of the carriage and prevent the reservoir B from banging against the rear wall of the stove. As previously explained, I wish it to be clearly understood that my invention is not limited to the particular means herein illustrated for governing the movement of the water reservoir B into and out of the internal space of the stove in which it is normally housed, and for effecting the automatic engagement and/or disengagement of the water reservoir with the means employed to heat the same, as there are literally hundreds of ways of attaining this result. Moreover, as previously explained, my invention is not limited to use with combination cookstoves, but on the contrary, is applicable to cookstoves in which only one kind of fuel is used to heat cooking utensils positioned on the top of the stove.

Having thus described my invention, what I claim as new and desire to secure by Letters Patent is:

1. A cookstove provided with a longitudinally shiftable hot water reservoir that is adapted to be partially withdrawn from the stove in order to fill or replenish said reservoir, a heated part on the interior of the stove arranged at one side of the reservoir for heating the same, and a means for normally maintaining one side of said reservoir in proper heating relationship with said heated part, comprising a device that moves with the reservoir, and a co-acting stationary device, disposed so as to cause the reservoir to move laterally with relation to said heated part or transversely with relation to the path of movement of the reservoir, when the reservoir is being shifted into and out of its normal position.

2. A stove of the kind described in claim 1, in which said stationary device consists of a track or guide mounted on the bottom of the space in the stove in which the reservoir is normally positioned, disposed at an angle to the part of the stove which supplies heat to the reservoir.

3. A stove of the kind described in claim 1, provided with a carriage that sustains or supports the reservoir, the device that moves with the reservoir being attached to said carriage.

4. A stove of the kind described in claim 1, provided with a carriage on which the reservoir is removably mounted, a laterally-projecting flange on said carriage, and a stationary member that co-operates with said flange to prevent said carriage from tilting downwardly when the reservoir is shifted into its filling position.

5. A cookstove provided with an oven having a chamber arranged at one side of said oven, a substantiallly oblong-shaped, shiftable hot water reservoir normally positioned in said chamber in parallel relationship with a side wall of said oven that transmits heat to the adjacent side wall of the reservoir, said reservoir being adapted to be partially withdrawn from said chamber in order to fill or replenish the reservoir, a stationary guide on the bottom of said chamber, disposed at an angle to the oven wall which supplies heat to the reservoir, and a device combined with the reservoir and adapted to co-act with said guide to position the reservoir in proper relationship with said oven wall when the reservoir is restored to its normal position after being filled or replenished.

6. In a stove of the kind described in claim 5, a part combined with said reservoir and projecting laterally from one side of same, and a stationary member in said chamber that laps over said part and holds the reservoir against tilting movement when the reservoir is being filled or replenished.

7. In a stove of the kind described in claim 5, a carriage arranged to travel on the bottom of said chamber and having the reservoir removably mounted on same, the device previously mentioned that co-acts with said guide being attached to the underside of said carriage.

ARTHUR H. STEIN.